Oct. 17, 1967   W. K. LARKIN   3,347,499
LANDING GEAR APPARATUS FOR LIGHT AMPHIBIOUS AIRCRAFT
Filed June 17, 1966   2 Sheets-Sheet 1

INVENTOR.
WALLACE K. LARKIN
BY  Q. C. Smith
ATTORNEY

Oct. 17, 1967  W. K. LARKIN  3,347,499
LANDING GEAR APPARATUS FOR LIGHT AMPHIBIOUS AIRCRAFT
Filed June 17, 1966  2 Sheets-Sheet 2

INVENTOR.
WALLACE K. LARKIN
BY
*A. C. Smith*
ATTORNEY

United States Patent Office 3,347,499
Patented Oct. 17, 1967

3,347,499
LANDING GEAR APPARATUS FOR LIGHT
AMPHIBIOUS AIRCRAFT
Wallace K. Larkin, 74 Hollins Drive,
Santa Cruz, Calif. 95060
Filed June 17, 1966, Ser. No. 558,429
5 Claims. (Cl. 244—101)

ABSTRACT OF THE DISCLOSURE

An improved landing gear uses a retractable aquaskid and hydrofoils to provide requisite hydrodynamic lift during takeoff and landing in water. Wheels and fairings at the distal ends of the hydrofoils provide static buoyancy for roll stability in water with the aquaskid extended and provide ground-engaging support during conventional takeoff and landing when the aquaskid is retracted.

This invention relates to amphibious aircraft and more particularly to landing gear apparatus for a light plane which is readily convertible to an aquaskid and hydrofoil lifting structure for landings and takeoffs on conventional runways as well as on water, snow, ice, mud or even wet grass. A structure of this type also provides means for absorbing landing shocks and obviates the need for a planing hull fuselage design which typically shows poor flight characteristics and which generally requires costly and heavy construction throughout to withstand the stresses and shocks of water landings.

Accordingly, it is the principal object of the present invention to provide amphibious landing gear apparatus of simple construction which readily converts from a tricycle landing gear to an aquaskid and hydrofoil structure.

In accordance with the illustrated embodiment of the present invention, an aquaskid or water ski is extended beneath the buoyant fuselage of a light plane by simple mechanical linkage to serve as the planing surface during water landings and takeoffs. A wheeled landing gear is retracted by the same mechanical linkage to a position in which the supporting struts of the transversely spaced wheels serve as hydrofoils and the fairing for such wheels serve as buoyant support members.

Other and incidental objects of the present invention will be apparent from a reading of this specification and an inspection of the accompanying drawings in which.

Figure 1:
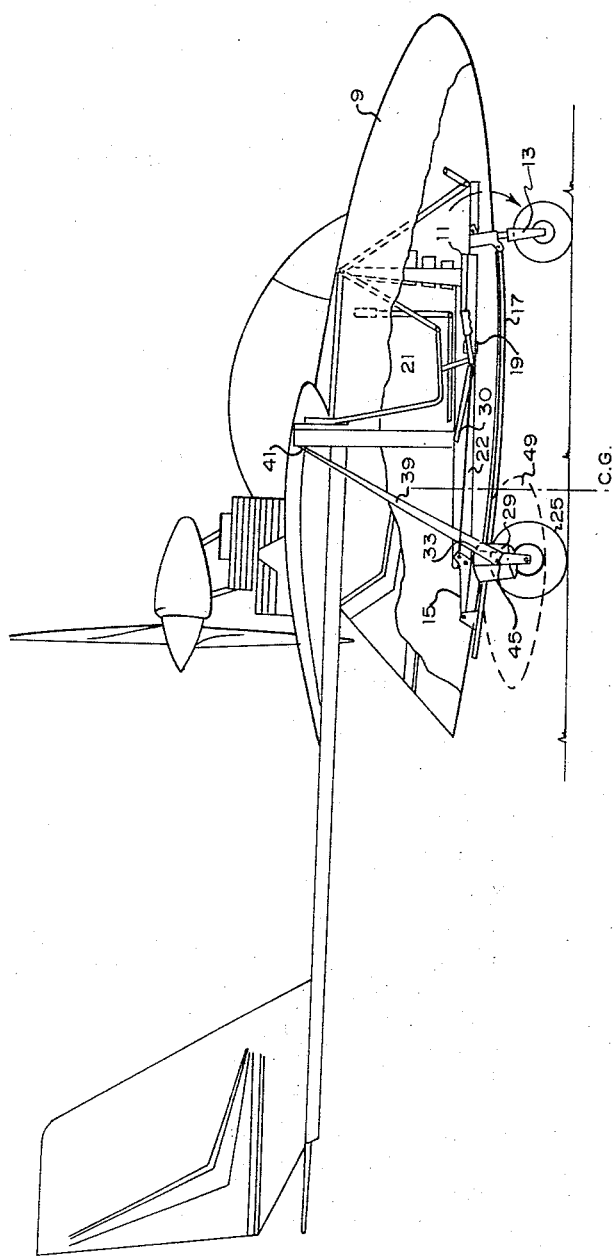
FIG. 1 is a partially cutaway view of a light amphibious aircraft showing the landing gear apparatus of the present invention.
Figure 2:
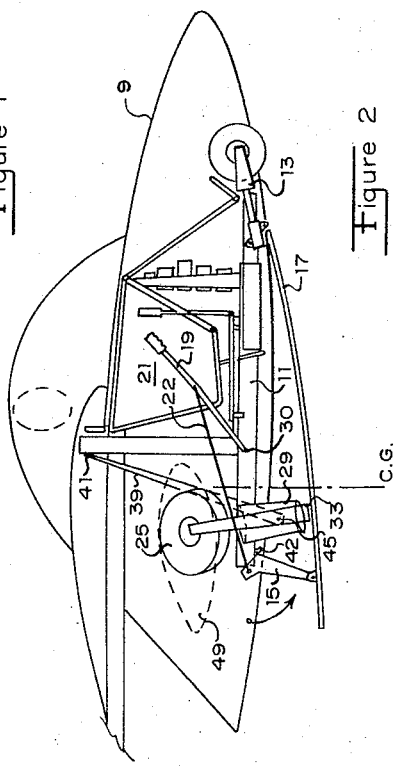
FIG. 2 is a sectional view showing the landing gear apparatus of FIGURE 1 with the aquaskid in extended position.
Figure 4:
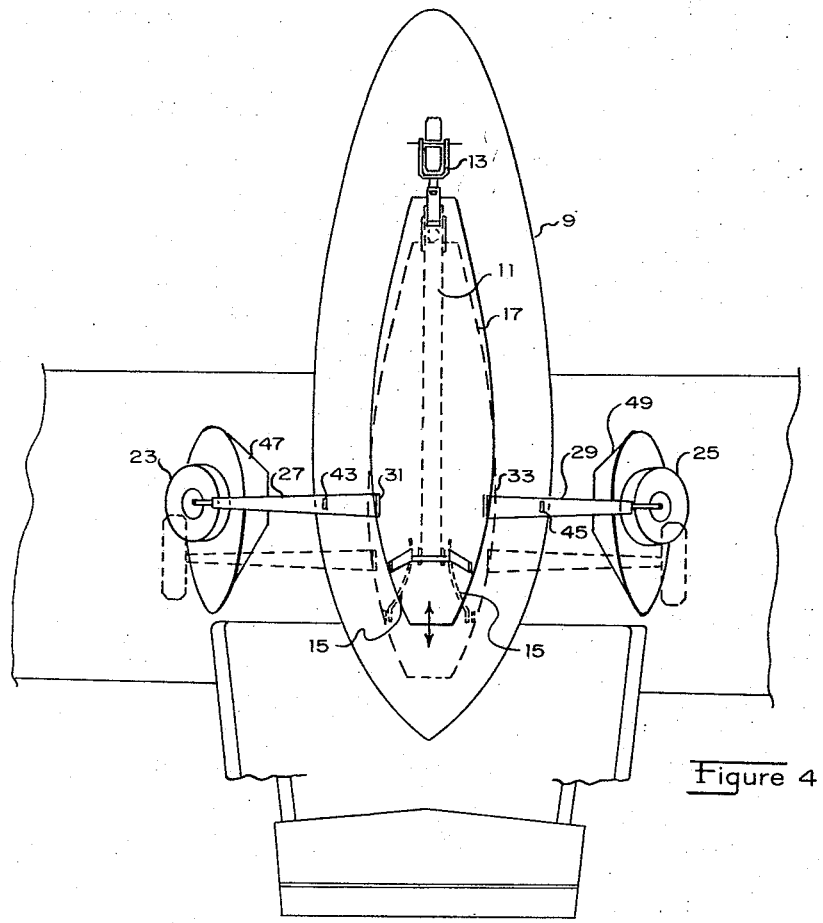
FIGURE 4 is a bottom view of the landing gear apparatus of FIGURES 1 and 2.
Figure 3:
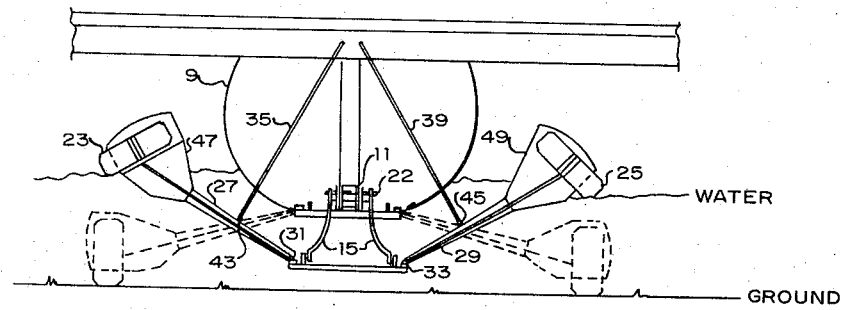
FIGURE 3 is a rear view of the landing gear apparatus of FIGURES 1 and 2.

Referring to the side views of FIGURES 1 and 2, there is shown an airplane having a fuselage 9 which has desired aerodynamic characteristics but which need not have any special hydrodynamic or hydrostatic characteristics other than static buoyancy and water tightness. A main structural member 11 within the fuselage pivotally supports the nose wheel 13 near its forward end and pivotally supports an actuating arm 15 near its rearward end. This actuating arm 15 is bowed inwardly to form a spring member (FIGURE 3) for absorbing the shock and stresses produced during landing maneuvers. An aquaskid or ski-like planing surface 17 is pivotally attached at its forward end to the nose wheel 13 and at its rearward end to the spring-like actuating arm 15 with portions of its planing area disposed ahead of and to the rear of the center of gravity of the airplane. A simple lever arm 19 within the cockpit region 21 of the fuselage 9 and a linkage rod 22 coupled between the lever arm 19 and actuating arm 15 thus performs several functions in its rotational movement about pivot 30. Its rotational movement counterclockwise pivots the aquaskid 17 downward and forward and thereby rotates the nosewheel 13 upwardly into retracted position, as shown in FIGURE 2, where it may serve as a bumper during taxiing and docking. Also, this movement of lever arm 19 about its pivot 30 retracts the main wheels 23, 25 and thereby sets the hydrofoil-shaped wheel struts 27, 29 and buoyant wheel fairings 47, 49 into water landing position, as shown in FIGURES 2 and 3. The main wheels 23, 25 are transversely spaced to form a tricycle landing gear with the nosewheel 13. These main wheels with their associated buoyant fairings 47, 49 are supported on the hydrofoil-shaped struts 27, 29 that are supported at their inner ends 31, 33 on the aquaskid 17 for rotation in a plane normal to the longitudinal axis of fuselage 9. Struts 35 and 39 are pivotally attached at their upper ends 37, 41 to the structural member 40 of the fuselage 9 for supporting the landing wheel struts 27, 29 at points 43 and 45 thereon intermediate the ends thereof for movement along the longitudinal axis of the fuselage 9 as the aquaskid 17 is moved forward and downward into operative position, as shown in FIGURE 2. Thus, when the aquaskid 17 is in the retracted position (FIGURE 1), the landing wheel struts 27, 29 are in the downwardly extended position and the nosewheel 13 is in its downwardly extended position to form the normal ground landing configuration. Locking means including member 42 on structural member 11 of the fuselage 9 and member 44 on the aquaskid 17 is provided to aid in transmitting the ground-landing forces from the landing gear to the fuselage 9 when the aquaskid 17 is in the retracted position, as shown in FIGURE 1. However, when the aquaskid 17 is extended downward and forward by the spring-like actuating arm 15 and the associated linkage, the nosewheel 13 is retracted upwardly and the landing wheel struts 27, 29 are rotated upwardly so that the aquaskid 17 is in the lowermost position to contact the surface of the water during takeoff and landing. The angle of attack of the aquaskid surface relative to the line of flight of the airplane provides the necessary lift at planing speeds. Also, the landing wheel struts 27 and 29, shaped as hydrofoils, provide the necessary lift in water when the airplane is operating therein at speeds which are insufficient for surface planing on the aquaskid 17. The dihedral angle of these struts in the retracted position improves the stability of the aircraft in water when operating at sub-surface planing speeds. Also, the landing wheel fairings 47, 49 which may include hollow compartments or other buoyant structures such as polystyrene or polyurethane foam members, increase the buoyancy of the fuselage 9 and serve as roll stabilizers when the aircraft is merely floating or is moving in water at very slow speeds.

Therefore, the landing gear apparatus of the present invention is readily convertible for takeoffs and landings in water and on land. Also, the shocks and stresses of water landings are concentrated substantially only at two points, i.e., the forward and rearward ends of the aquaskid, thus permitting shock absorption at these two points and eliminating the need for overall structural rigidity and concomitant weight of conventional amphibious fuselages of planing-hull design. Further, since the landing gear apparatus of the present invention provides high lift and stability in water during takeoff and landing independent of the shape of the fuselage, it may be made structurally light with desired aerodynamic characteristics without regard for its hydrodynamic characteristics.

I claim:
1. Landing gear apparatus for an airplane having a fuselage, the apparatus comprising:
an aquaskid;
mounting means attaching the aquaskid longitudinally beneath the fuselage of the airplane with a forward portion of the aquaskid disposed ahead of the center of gravity of the airplane and with a rearward portion disposed to the rear of the center of gravity of the airplane, said mounting means variably extending the aquaskid to a selected position below said fuselage;
a pair of support elements having hydrofoil shapes; and
means supporting the inner ends of said support elements on said aquaskid to extend transversely outward and upward therefrom near the center of gravity of said airplane when said aquaskid is extended to a selected position below the fuselage for takeoff or landing in water.

2. Landing gear apparatus as in claim 1 wherein:
means are attached to said support elements at points thereon intermediate the ends thereof for supporting the same with respect to said fuselage;
the inner ends of the support elements are pivotally supported on said aquaskid; and
said mounting means supports said aquaskid for generally vertical movement relative to said fuselage between a retracted position in which the aquaskid is disposed closely adjacent the underside of the fuselage with said support elements disposed transversely outward and downward and an extended position in which the aquaskid is disposed below and spaced away from the underside of the fuselage with the support elements disposed transversely outward and upward.

3. Landing gear apparatus as in claim 1 wherein:
said mounting means includes a first member which attaches the aquaskid at a location adjacent the forward end thereof to the fuselage and a second member including resilient means for absorbing shock forces exerted on the aquaskid, said second member attaches the aquaskid at a location adjacent the rearward end thereof to the fuselage.

4. Landing gear apparatus as in claim 1 wherein:
said mounting means includes a first member attaching said aquaskid near the forward end thereof to said fuselage; and comprising:
first and second wheels rotatably mounted on the support elements at the ends thereof remote from said inner ends; and
a third wheel rotatably mounted on the first member for forming with said first and second wheels a three-wheeled ground engaging landing gear for said airplane.

5. Landing gear apparatus as in claim 1 comprising:
hydrostatically buoyant members attached to said support elements near the ends thereof remote from said inner ends.

References Cited
UNITED STATES PATENTS

| | | | |
|---|---|---|---|
| 1,784,784 | 12/1930 | Douglas | 244—101 |
| 2,255,046 | 9/1941 | Diehl | 244—106 |
| 3,191,567 | 6/1965 | Ask | 114—66.5 |

FOREIGN PATENTS
409,019  4/1934  Great Britain.

OTHER REFERENCES
Barnett, C.: The Sea-Dart, A Look Into the Future, Western Aviation, vol. 33, No. 8, pp. 30 and 31, August 1953.

EDO Tests Dual Hydroski Development, Aviation Week, vol. 58, No. 18, May 4, 1953, p. 16.

MILTON BUCHLER, *Primary Examiner.*

P. E. SAUBERER, *Assistant Examiner.*